(12) United States Patent
Kumagai et al.

(10) Patent No.: US 8,070,183 B2
(45) Date of Patent: Dec. 6, 2011

(54) AIRBAG AND AIRBAG APPARATUS

(75) Inventors: Masayoshi Kumagai, Tokyo (JP);
Yasuhito Miyata, Tokyo (JP); Kazuhiro Abe, Tokyo (JP); Christoph Knappe, Tokyo (JP)

(73) Assignee: Takata Corporation, Tokyo (JP)

( * ) Notice: Subject to any disclaimer, the term of this patent is extended or adjusted under 35 U.S.C. 154(b) by 28 days.

(21) Appl. No.: 12/458,823

(22) Filed: Jul. 23, 2009

(65) Prior Publication Data

US 2010/0032931 A1 Feb. 11, 2010

(30) Foreign Application Priority Data

Aug. 6, 2008 (JP) ................................. 2008-203245

(51) Int. Cl.
*B60R 21/2334* (2011.01)
*B60R 21/2338* (2011.01)
(52) U.S. Cl. ....................... 280/743.2; 280/732; 280/736
(58) Field of Classification Search ............... 280/728.1, 280/731, 732, 743.1, 743.2, 736
See application file for complete search history.

(56) References Cited

U.S. PATENT DOCUMENTS

| | | | |
|---|---|---|---|
| 6,676,158 B2 * | 1/2004 | Ishikawa ..................... | 280/743.1 |
| 6,832,778 B2 * | 12/2004 | Pinsenschaum et al. ..... | 280/739 |
| 7,237,802 B2 * | 7/2007 | Rose et al. .................. | 280/743.1 |
| 7,347,450 B2 * | 3/2008 | Williams et al. ............. | 280/739 |
| 7,364,192 B2 | 4/2008 | Braun et al. | |
| 7,458,607 B2 * | 12/2008 | Abe .............................. | 280/739 |
| 7,607,690 B2 * | 10/2009 | Abe et al. ....................... | 280/739 |
| 7,614,654 B2 * | 11/2009 | Williams ...................... | 280/743.1 |
| 7,614,656 B2 * | 11/2009 | Ishiguro et al. ............. | 280/743.1 |
| 7,651,130 B2 * | 1/2010 | Bauberger .................. | 280/743.2 |
| 7,695,012 B2 * | 4/2010 | Libby et al. ................. | 280/743.1 |
| 7,726,685 B2 * | 6/2010 | Abe et al. ...................... | 280/736 |
| 2005/0098990 A1 * | 5/2005 | Pinsenschaum et al. ..... | 280/739 |
| 2005/0236822 A1 * | 10/2005 | Rose et al. ..................... | 280/739 |
| 2005/0248137 A1 | 11/2005 | Delventhal et al. | |
| 2006/0028009 A1 * | 2/2006 | Hasebe et al. ............. | 280/743.1 |
| 2006/0071462 A1 * | 4/2006 | Smith et al. .................. | 280/739 |
| 2006/0131859 A1 * | 6/2006 | Kumagai .................... | 280/743.1 |
| 2006/0151979 A1 | 7/2006 | DePottey et al. | |
| 2007/0045997 A1 * | 3/2007 | Abe et al. ....................... | 280/729 |
| 2007/0145729 A1 * | 6/2007 | Ishiguro et al. ............... | 280/739 |
| 2008/0023950 A1 | 1/2008 | Kalczynski et al. | |
| 2008/0303256 A1 * | 12/2008 | Williams ...................... | 280/742 |
| 2008/0315567 A1 * | 12/2008 | Fischer et al. ................ | 280/732 |
| 2009/0033081 A1 * | 2/2009 | FIischer et al. ............. | 280/743.2 |

(Continued)

FOREIGN PATENT DOCUMENTS

| | | |
|---|---|---|
| FR | 2 757 465 | 6/1998 |
| JP | H06-127330 | 5/1994 |
| JP | 2000-142307 A | 5/2000 |
| JP | 2007-99104 A | 4/2007 |
| JP | 2007216943 A * | 8/2007 |

(Continued)

*Primary Examiner* — Faye M Fleming
*Assistant Examiner* — James English
(74) *Attorney, Agent, or Firm* — Manabu Kanesaka

(57) ABSTRACT

An airbag to be inflated by gas for a vehicle includes a base member for the airbag, an opening and closing vent provided in the base member, and a discharging gas control member for restraining gas from discharging from the opening and closing vent. The discharging gas control member closes or slightly opens the opening and closing vent when an occupant does not contact a front surface of the airbag facing the occupant when the airbag is inflated. The discharging gas control member opens or widely opens the opening and closing vent so as to allow the gas to be discharged from the opening and closing vent when the occupant contacts the front surface of the airbag, and the front surface is pushed in a direction opposite to the occupant.

18 Claims, 13 Drawing Sheets

U.S. PATENT DOCUMENTS

| | | | |
|---|---|---|---|
| 2009/0121461 A1* | 5/2009 | Abe et al. | 280/728.3 |
| 2009/0206587 A1* | 8/2009 | Abe | 280/743.1 |
| 2009/0224522 A1* | 9/2009 | Fischer et al. | 280/743.1 |
| 2009/0289444 A1* | 11/2009 | Keshavaraj | 280/736 |
| 2010/0001498 A1* | 1/2010 | Abe et al. | 280/739 |
| 2010/0007124 A1* | 1/2010 | Fischer et al. | 280/743.1 |
| 2010/0019476 A1* | 1/2010 | Pausch | 280/742 |
| 2010/0102542 A1* | 4/2010 | Nakajima et al. | 280/743.2 |
| 2011/0031725 A1* | 2/2011 | Rose et al. | 280/736 |

FOREIGN PATENT DOCUMENTS

| | | |
|---|---|---|
| JP | 2008056175 A * | 3/2008 |
| WO | WO 2006/009404 A2 | 1/2004 |
| WO | WO 2006/041547 A2 | 4/2006 |
| WO | WO 2006/041552 A2 | 4/2006 |
| WO | WO 2008/015877 A1 | 2/2008 |
| WO | WO 2008084605 A1 * | 7/2008 |
| WO | WO 2009/016871 A1 | 2/2009 |

* cited by examiner

AIRBAG AND AIRBAG APPARATUS

BACKGROUND OF THE INVENTION AND RELATED ART STATEMENT

The present invention relates to an airbag including an opening and closing vent and a discharging gas control member configured to restrain gas from discharging from the opening and closing vent. More specifically, the present invention relates to an airbag configured in such a manner that the opening and closing vent is closed until an occupant comes into contact with a surface facing the occupant of the inflated airbag, and that the vent is opened when the occupant comes into contact with the surface of the inflated airbag and the surface of the airbag is pressed in a direction opposite to an inflating direction of the airbag. The present invention also relates to an airbag apparatus having the airbag.

In the present invention, the term AF05 type occupant dummy is an occupant dummy for a vehicle collision experiment which corresponds a 5 percentile small size adult woman specified in United State regulations, and the term AM50 type occupant dummy is an occupant dummy for a vehicle collision experiment which corresponds a 50 percentile adult man which has a larger size than the 5 percentile small size adult woman.

It is widely known to providing a vent on an airbag and allowing gas to be discharged from the interior of an airbag out of the airbag via the vent when the vehicle occupant or the like comes into contact with the inflated airbag to receive the vehicle occupant or the like softly.

In the US publication US 2006/0151979A1 (Patent Document 1), a configuration in which the vent is opened and closed according to the position of the occupant when the airbag is inflated is shown.

In Patent Document 1, a vent is provided on a side surface of an airbag, and a vent flap is attached so as to cover the vent from the inside of the airbag. This vent flap is joined at one end thereof to a portion in the vicinity of the vent by stitching or the like and is not joined to the airbag at the other end. A strap is provided at the other end side of the vent flap. The distal end side of the strap is connected to a surface facing the occupant of the airbag when inflated. A middle portion of the strap is inserted into a loop provided on an inner surface of the airbag.

When the airbag is started to be inflated, the vent flap is drawn out of the airbag via the vent, whereby the vent is opened.

In a state in which the occupant is positioned at a normal seated position, that is, so-called an in-position, the airbag is inflated to an inflation-completed shape before the occupant comes into contact with a front surface facing the occupant. At this time, the entire part of the vent flap is pulled by the strap and is pulled inwardly of the airbag, and the vent flap is pushed against the vent by a gas pressure in the airbag, thereby closing the vent. Accordingly, discharging of the gas from the vent is restrained.

In a state in which the occupant is positioned forward of the normal seated position, that is, so called an out-of-position, the occupant comes into contact with the surface facing the occupant of the airbag before the airbag is inflated to the inflation-completed state. Therefore, the vent flap is not pulled inwardly of the airbag by the strap, and the vent is kept in the opened state. Accordingly, the gas is discharged from the airbag via the vent, and the airbag loses its reaction force.

Even in a state of the in-position in which the occupant is positioned in the normal seated position, the vent is preferably opened to allow the gas to be discharged from the airbag after the airbag has received the occupant. In this case, the vent is preferably opened in an early stage after the occupant has come into contact with the airbag.

The occupant fastened with a seat belt and seated on a seat is constrained at a lumbar part from moving forward by a lap belt upon collision of the vehicle, so that an upper half body rotates downward relative to the lumbar part. Therefore, the head portion of the occupant comes into contact with the surface facing the occupant of the airbag in an earlier stage than other portions.

It is an object of the present invention to provide an airbag in which an opening and closing vent is opened soon after an occupant restrained by the seat belt and seated on a seat comes into contact with a surface facing the occupant of the inflated airbag upon collision of the vehicle, and an airbag apparatus having the same.

Further objects and advantages of the invention will be apparent from the following description of the invention.

SUMMARY OF THE INVENTION

An airbag according to a first aspect of the present invention is an airbag including an opening and closing vent and a discharging gas control member configured to restrain gas from discharging from the opening and closing vent. The discharging gas control member closes the opening and closing vent or slightly opens the opening and closing vent when an occupant does not come into contact with a surface facing the occupant (front surface) of the airbag during inflation of the airbag. The discharging gas control member further opens the opening and closing vent or widely opens the opening and closing vent when the occupant comes into contact with the front surface of the inflated airbag whereby the front surface is moved backward in the direction opposite from the occupant to allow the gas to be discharged from the opening and closing vent out of the airbag. The discharging gas control member is configured to open the opening and closing vent or widely open when a portion of the front surface of the airbag facing the head portion of the occupant is moved backward in the direction opposite from the occupant.

The airbag according to a second aspect is, in the first aspect, that the occupant is an AF05 type dummy.

The airbag according to a third aspect is, in the first or second aspect, that at least portion of the front surface of the airbag facing the head portion of the occupant corresponds to a recessed portion which is recessed toward a direction opposite to the occupant with respect to the periphery thereof in a state when the inflation is completed.

The airbag according to a fourth aspect is, in any one of the first to third aspects, that the discharging gas control member closes or slightly opens the opening and closing vent when a tensile force is applied inwardly of the airbag and opens or widely opens the opening and closing vent when the tensile force is reduced. The airbag further includes a connecting member configured to connect the discharging gas control member and the head-facing portion. The connecting portion is tensed between the head-facing portion and the discharging gas control member when the occupant does not come into contact with the head-facing portion in a state when the airbag is inflated. Therefore, the tensile force is applied to the discharging gas control member to close or slightly open the opening and closing vent. The connecting member is loosened when the occupant comes into contact with the head-facing portion of the inflated airbag, whereby the head-facing portion is moved backward, thereby reducing the tensile force, and opening or widely opening the opening and closing vent.

The airbag according to a fifth aspect is, in the fourth aspect, that the connecting member extends in substantially parallel to the direction in which the head-facing portion is pressed by the head portion of the occupant upon contacting when viewing the airbag from the left and right of the occupant in a state in which the airbag is inflated.

The airbag according to a sixth aspect is, in the fifth aspect, that the connecting member extends substantially horizontally or in the direction to be lowered as it goes away from the head-facing portion in the state in which the airbag is inflated.

The airbag according to a seventh aspect is, in the sixth aspect, that the angle of the direction of extension of the connecting member with respect to the horizontal direction is from 0 to 50° in the state in which the airbag is inflated.

The airbag according to an eighth aspect is, in any one of the fourth to seventh aspects, that the connecting member is connected to the head-facing portion in a range from 0 to 80 mm from a center of the head-facing portion in the lateral direction to the left and right when inflated.

The airbag according to a ninth aspect is, in any one of the fourth to eighth aspects, that the discharging gas control member is a vent flap which covers the opening and closing vent, the connecting member is tensed between the head-facing portion and the vent flap when the airbag is inflated, whereby the movement of the vent flap outwardly of the airbag is prohibited, and the connecting member is loosened when the vent flap is overlapped with the opening and closing vent to close the opening and closing vent or slightly open the opening and closing vent and the occupant comes into contact with the head-facing portion of the inflated airbag, whereby the head-facing portion is moved backward, so that the vent flap is moved away from the opening and closing vent by a gas pressure in the airbag and the opening and closing vent is opened or widely opened.

An airbag apparatus according to a tenth aspect of the present invention includes an airbag according to any one of the first to ninth aspects, and an inflator for inflating the airbag.

In the airbag according to the first aspect of the present invention and the airbag apparatus according to the tenth aspect of the present invention, the discharging gas control member is configured to open the opening and closing vent or widely open the same when the head-facing portion of the front surface of the inflated airbag facing the head portion of the occupant is moved backward in the direction opposite from the occupant. Therefore, when the occupant seated on the seat with the seat belt fastened falls into the inflated airbag and the head portion comes into contact with the front surface of the airbag, the opening and closing vent is opened or widely opened in an early stage.

Between a small size occupant and a large size occupant, the large size occupant has a larger kinetic energy upon collision of the vehicle. Therefore, in a case where the inflated airbag receives the large size occupant, the internal pressure of the airbag is preferably maintained at a high level for a relatively long time in comparison with a case of receiving the small size occupant.

In the mode in the second aspect, since the airbag is configured in such a manner that the opening and closing vent is opened or widely opened when the head-facing portion facing the head portion of the AF05 type dummy moves backward in a state of being inflated, when the small size occupant seated on the seat with the seat belt fastened falls into the inflated airbag, the opening and closing vent is opened or widely opened when the head portion of the occupant comes into contact with the head-facing portion in an early stage.

Also, when the large size occupant seated on the seat with the seat belt fastened falls into the inflated airbag, since the head portion of the occupant comes into contact with a portion of the front surface of the airbag shifted upward from the head-facing portion, the opening and closing vent is not opened or is not widely opened immediately when the head portion of the occupant comes into contact with the front surface of the airbag. Accordingly, when the inflated airbag received the large size occupant, the internal pressure in the airbag is maintained at a high level for a relatively long time, so that the large size occupant is stably received.

In the mode in the third aspect, when the airbag is inflated, a portion of the front surface which comes into contact with the head portion of the occupant is recessed, and hence the head portion of the occupant is received so as to allow the head portion of the occupant to enter the recessed portion, thereby enhancing the occupant restraining effect.

In a mode in the fourth aspect, when the occupant does not come into contact with the head-facing portion of the airbag when the airbag is inflated, the connecting member is tensed between the head-facing portion and the discharging gas control member, whereby a tensile force is applied on the discharging gas control member, so that the opening and closing vent is closed or slightly opened. Then, when the occupant comes into contact with the head-facing portion of the inflated airbag whereby the head-facing portion is moved backward, the connecting member is loosened, whereby the tensile force applied to the discharging gas control member is reduced, so that the opening and closing vent is opened or widely opened.

In the present invention, as in the fifth aspect, preferably, in the state in which the airbag is inflated, the connecting member extends in the direction substantially parallel to the direction in which the head-facing portion is pressed by the head portion when the head portion of the occupant comes into contact with the head-facing portion of the airbag when viewing the airbag from the left and right of the occupant in a state in which the airbag is inflated.

In this configuration, when the head portion of the occupant comes into contact with the head-facing portion of the airbag upon collision of the vehicle, since the direction of backward movement of the head-facing portion and the direction of extension of the connecting member are substantially the same direction, the amount of slackness of the connecting member is increased, so that the opening and closing vent is widely opened immediately.

As described above, the occupant seated on the seat with the seat belt fastened moves forward so that the upper half body downwardly rotates relative to the lumbar part as an axis upon collision of the vehicle. Therefore, when the head portion of the occupant comes into contact with the head-facing portion of the airbag, the head-facing portion is pressed obliquely downward from the substantially horizontal direction by the head portion of the occupant. Therefore, as in the sixth aspect, the connecting member preferably extends in the substantially horizontal direction or extends downward as it goes away from the head-facing portion when inflated. In this case, as in the seventh aspect, it is preferable that the angle of the extending direction of the connecting member with respect to the horizontal direction is 0 to 50°. In this configuration, when the head-facing portion is pressed and hence is moved backward from the head portion of the occupant seated on the seat with the seat belt fastened, the amount of slackness of the connecting member is increased, and the opening and closing vent is widely opened immediately.

As in the eighth aspect, the connecting member preferably is connected to the head-facing portion in a range from 0 to 80 mm from the center of the head-facing portion in the lateral direction to the left and right in the head-facing portion in a state when the airbag is inflated. Accordingly, the opening and closing vent is opened quickly when the head portion of the occupant comes into contact with the head-facing portion of the inflated airbag.

In the mode in the ninth aspect, since the discharging gas control member is a vent flap covering the opening and closing vent, the configuration is simple.

DETAILED DESCRIPTION OF PREFERRED EMBODIMENTS

Figure 1:
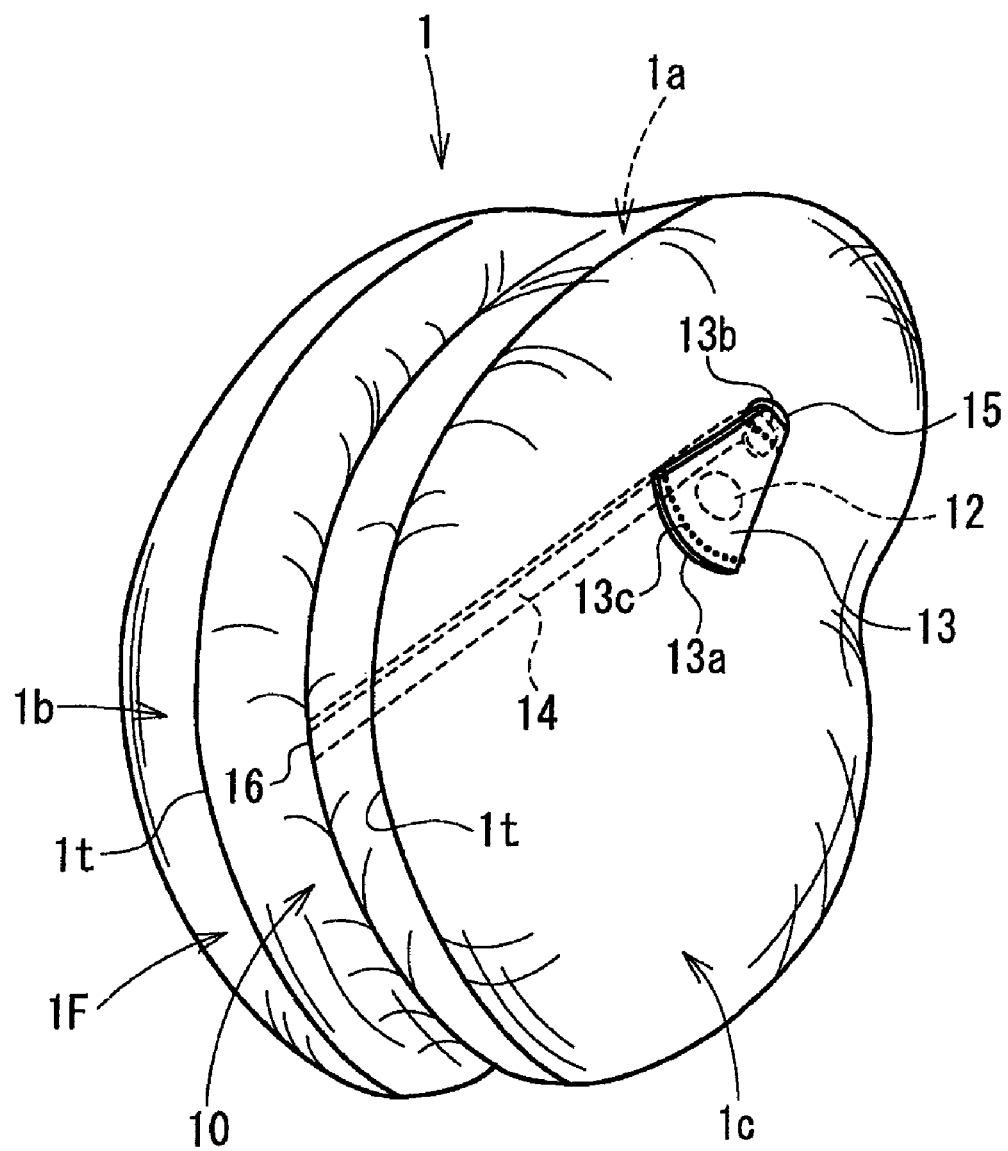
FIG. 1 is a perspective view of an airbag according to an embodiment of the present invention in an inflated state.

Referring now to the drawings, preferred embodiments of the present invention will be described.

Figure 2:
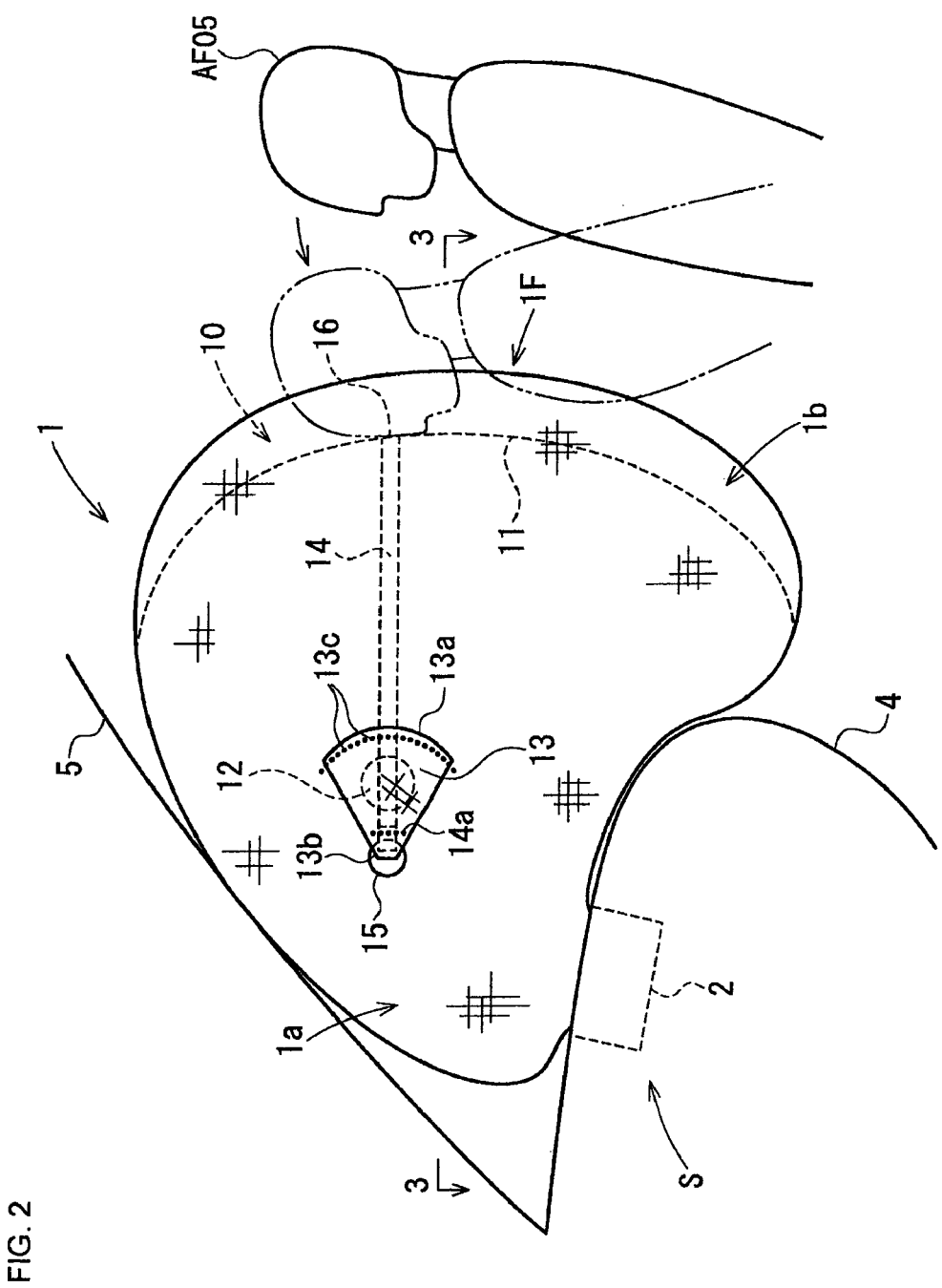
FIG. 2 is a side view of the airbag in the inflated state in FIG. 1.
Figure 3:
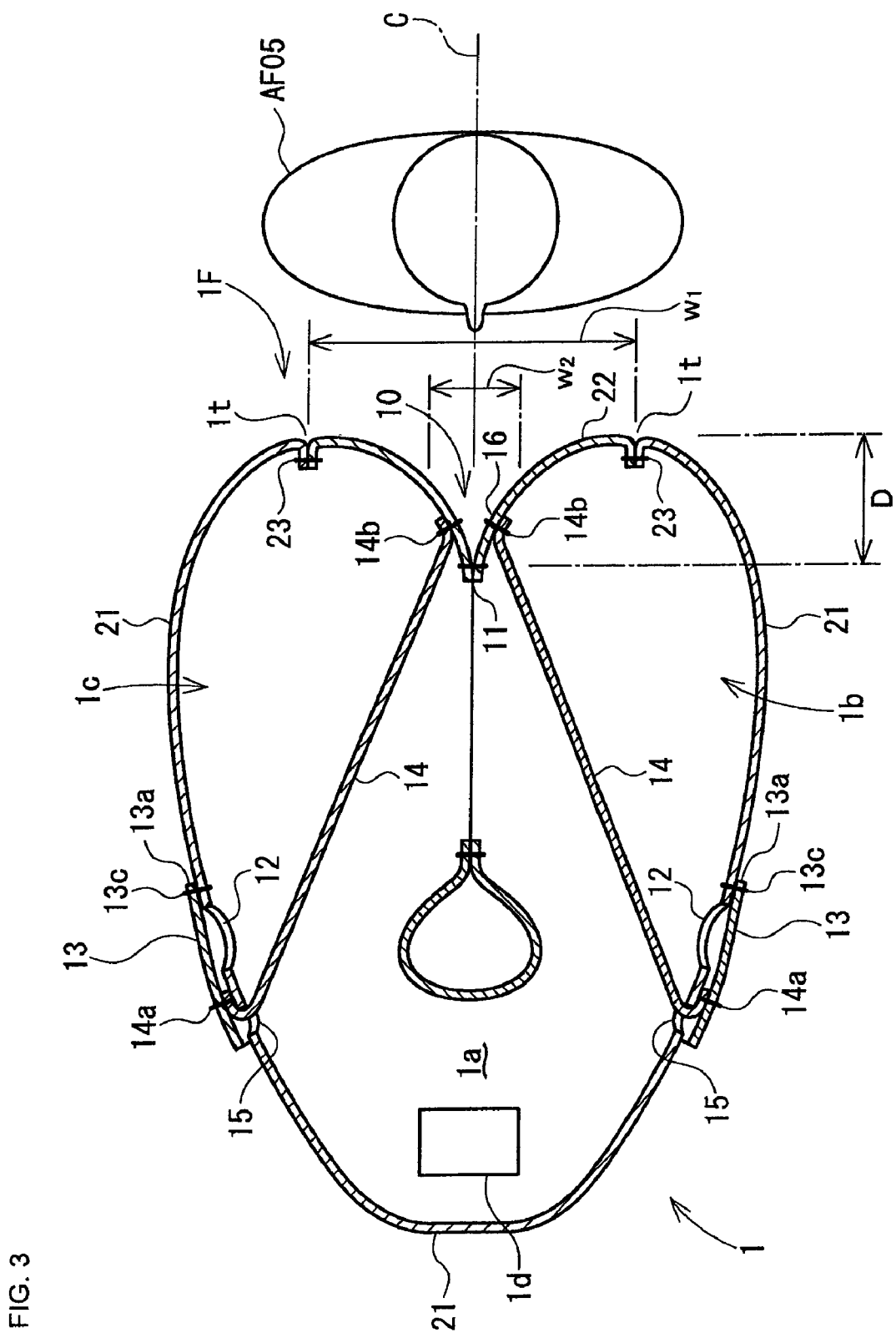
FIG. 3 is a cross-sectional view taken along the line 3-3 in FIG. 2.
Figure 4:
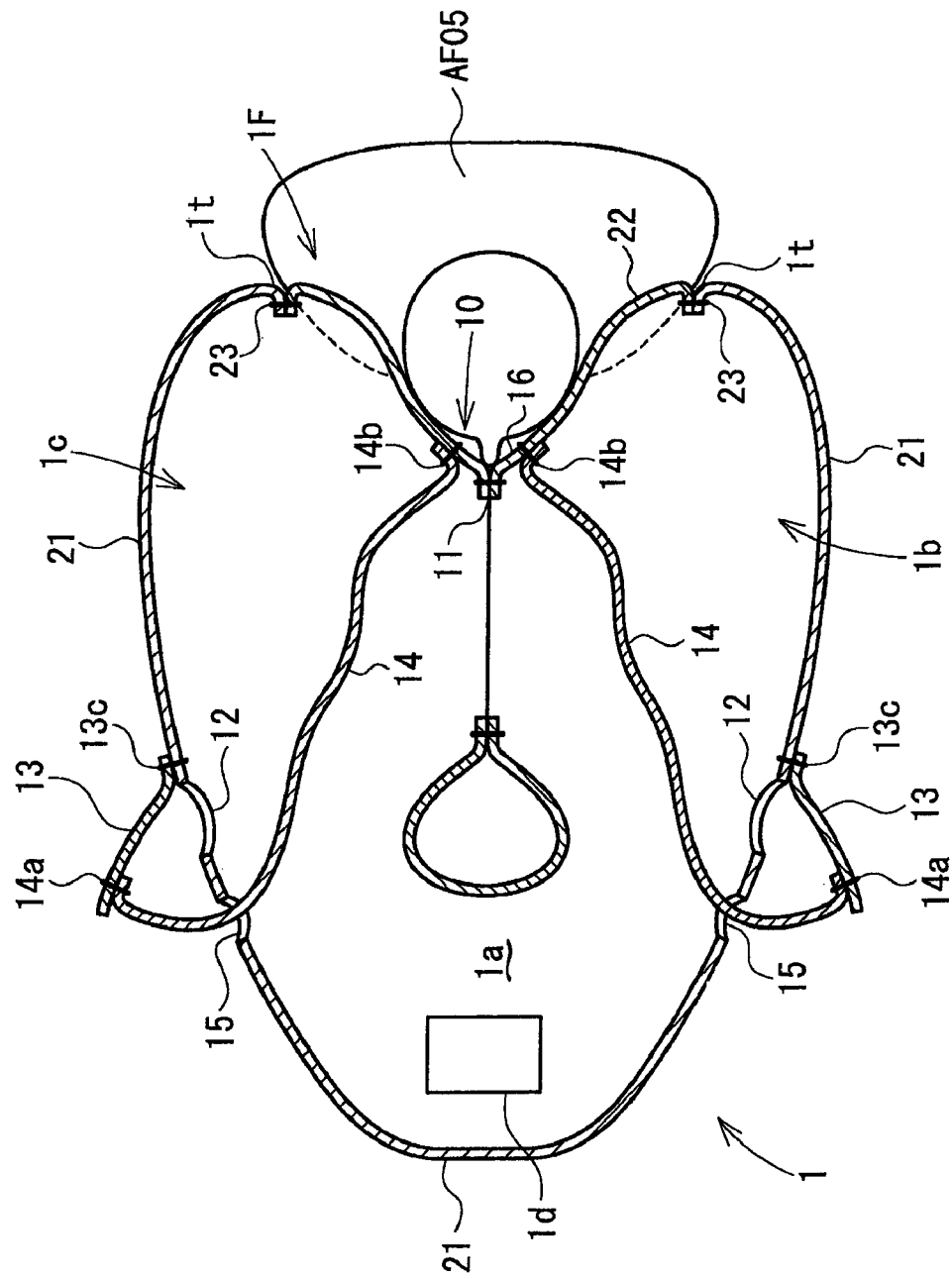
FIG. 4 is a cross-sectional view of a portion similar to FIG. 3 in a state in which an opening and closing vent is opened.
Figure 5:
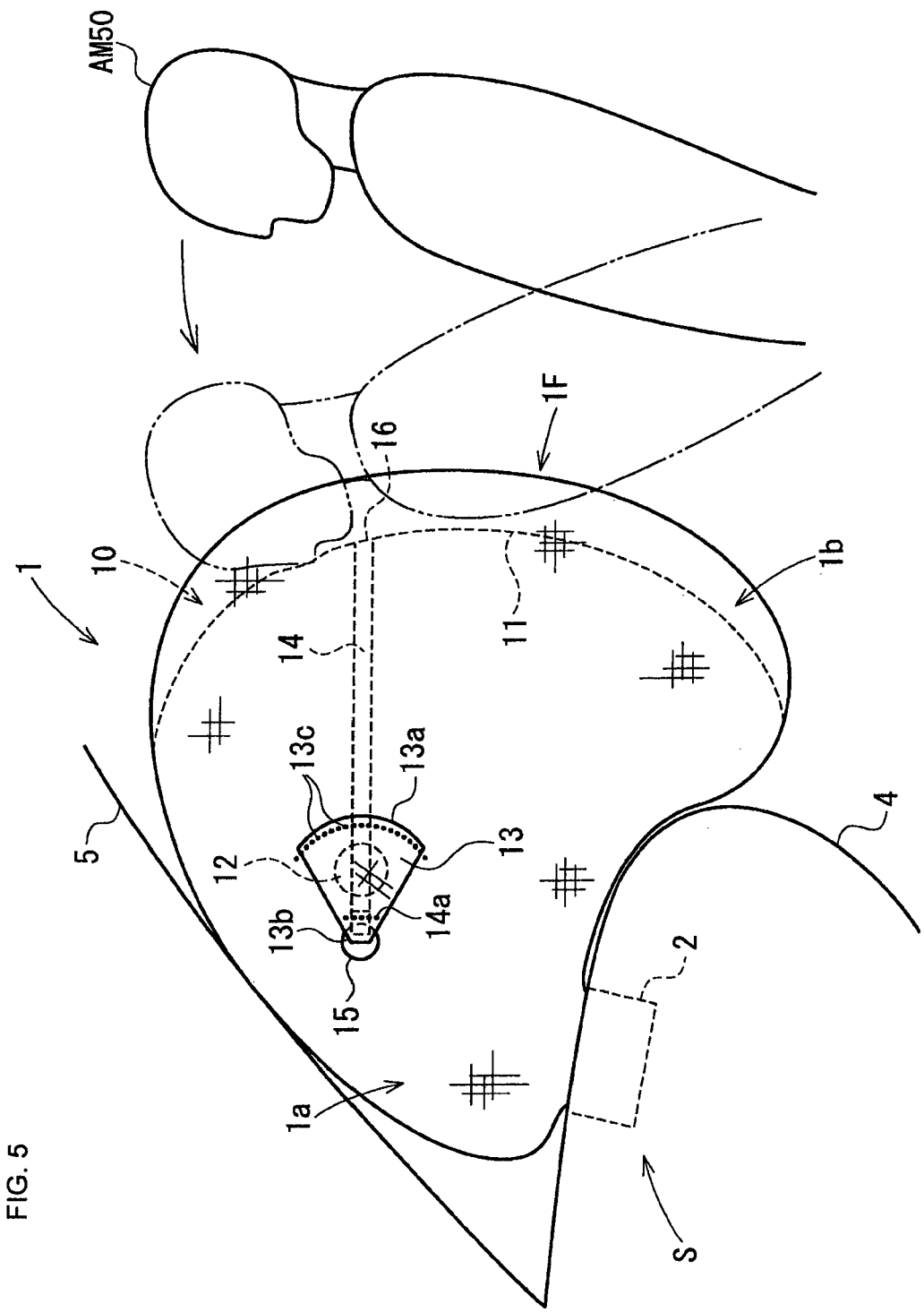
FIG. 5 is a side view showing a state in which a large size occupant faces the inflated airbag.
Figure 6:
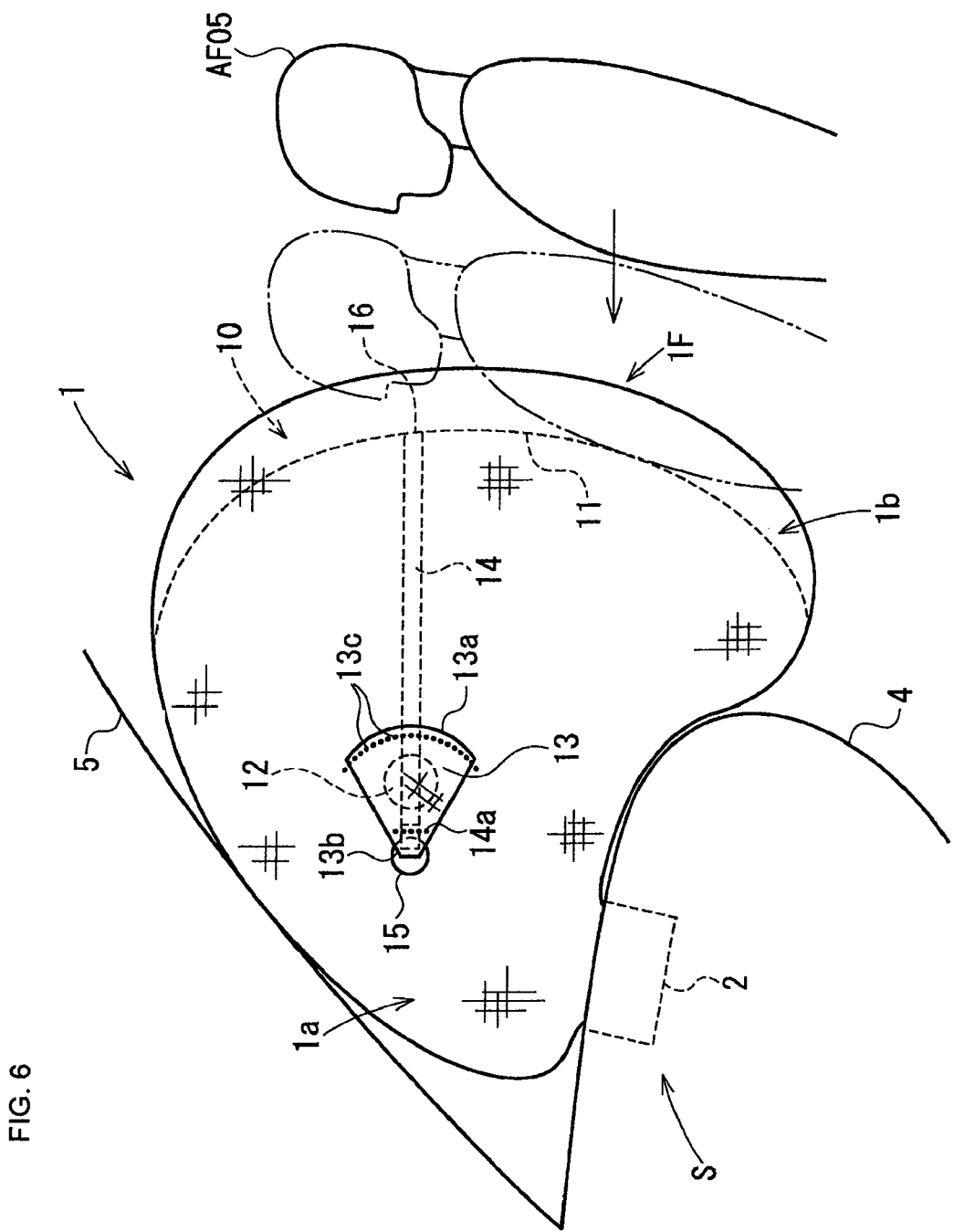
FIG. 6 is a side view showing a movement of a small size occupant who is not restrained by the seat belt until the occupant contacts the inflated airbag.
Figure 7:
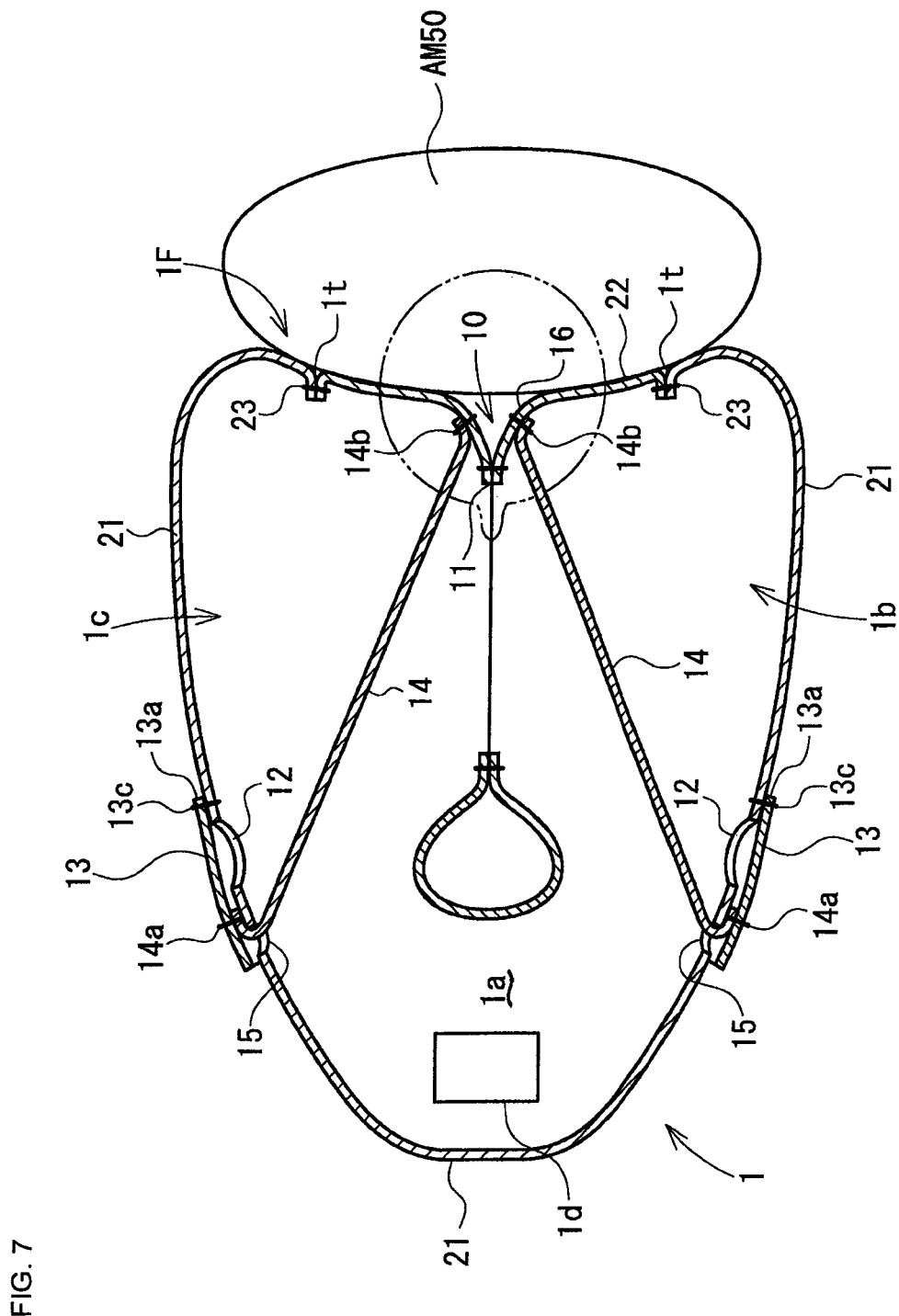
FIG. 7 is a cross-sectional view of a portion similar to FIG. 3 in a state immediately after the large size occupant who is not restrained by the seat belt contacts the inflated airbag.
Figure 8:
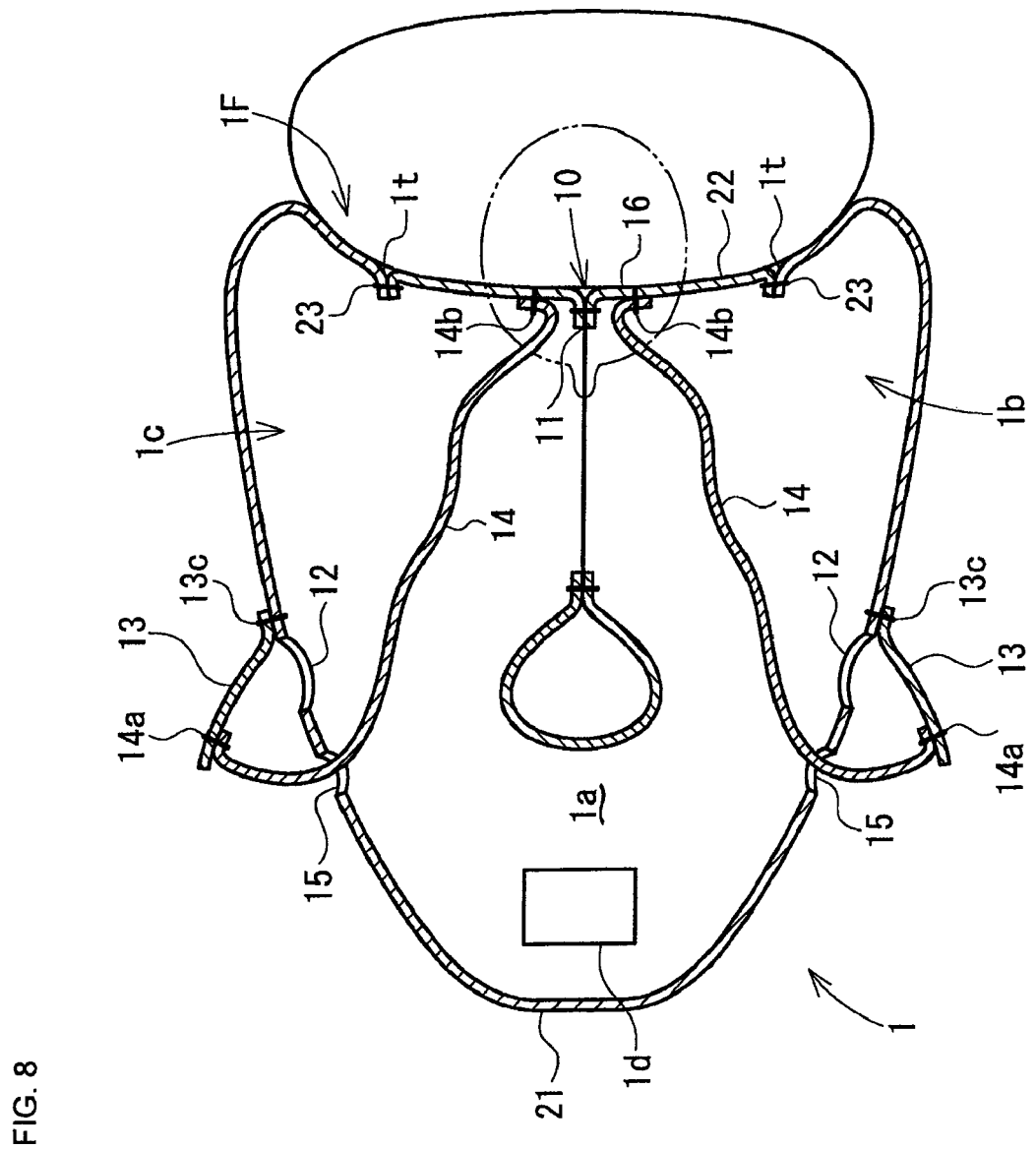
FIG. 8 is a cross-sectional view of a portion similar to FIG. 3 in a state in which the opening and closing vent is opened after the large size occupant who is not restrained by the seat belt contacts the inflated airbag.
Figure 9:
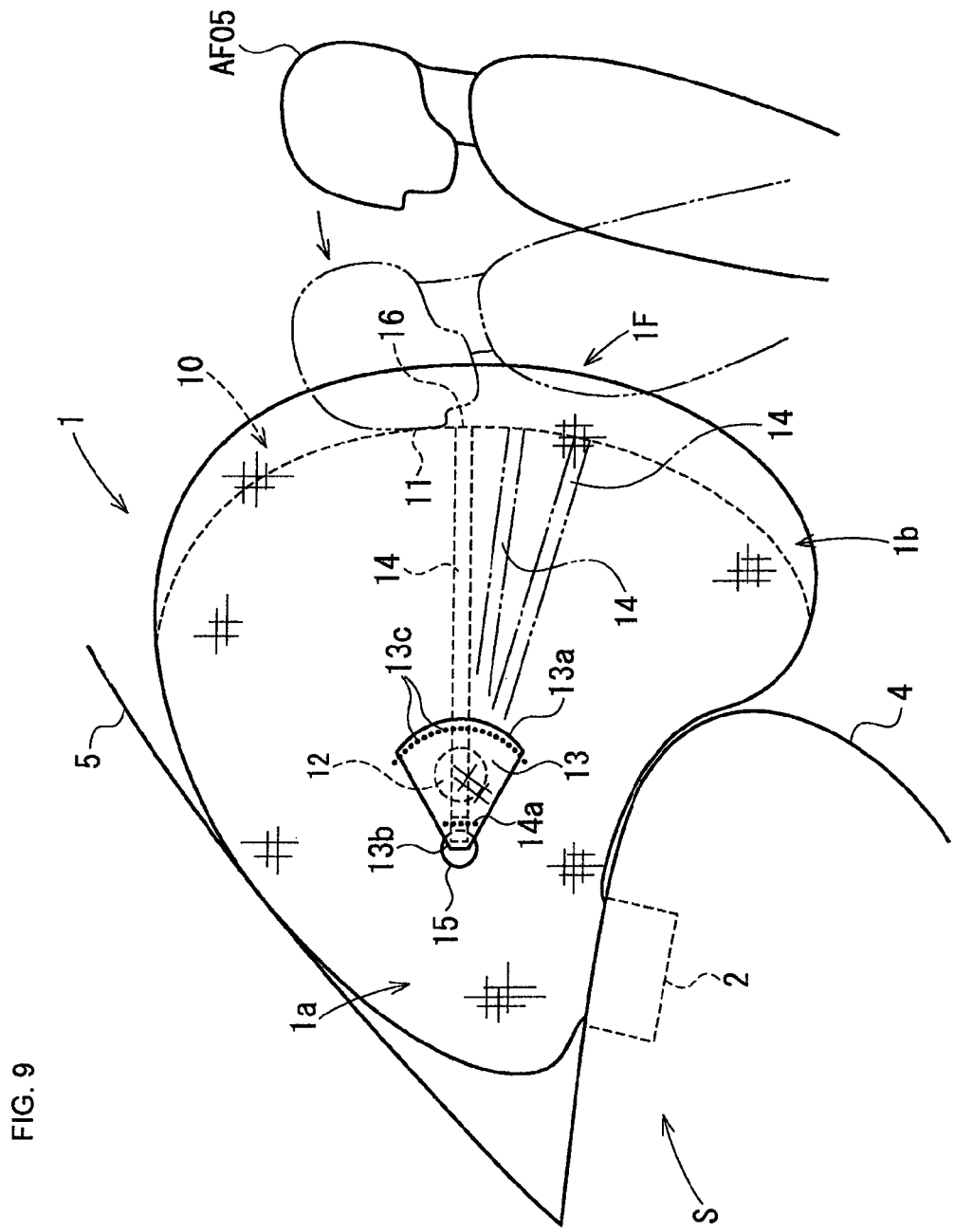
FIG. 9 is a side view showing arrangements of tethers in the embodiment and a comparative example.

FIG. 1 is a perspective view of an airbag according to an embodiment of the present invention in an inflated state; FIG. 2 is a side view of the airbag in the inflated state; FIG. 3 is a cross-sectional view taken along line 3-3 in FIG. 2; FIG. 4 is a cross-sectional view of a portion similar to FIG. 3 in a state in which an opening and closing vent is opened; FIG. 5 is a side view showing a state in which a large size occupant faces the inflated airbag; FIG. 6 is a side view showing a movement of a small size occupant who is not restrained by the seat belt until he or she comes into contact with the inflated airbag; FIG. 7 is a cross-sectional view of a portion similar to FIG. 3 in a state immediately after the large size occupant who is not restrained by the seat belt comes into contact with the inflated airbag; FIG. 8 is a cross-sectional view of a portion similar to FIG. 3 in a state in which the opening and closing vent is opened after the large size occupant who is not restrained by the seat belt comes into contact with the inflated airbag; and FIG. 9 is a side view showing an arrangements of tethers as connecting members in the embodiment and a comparative example. FIGS. 1 to 4 show a state in which the small size occupant faces the inflated airbag.

In the following description, the small size occupant means an AF05 (5 percentile adult woman) type occupant dummy, and the large size occupant means an AM50 (50 percentile adult man) type occupant dummy.

In the following description, front and rear directions and left and right directions correspond to front and rear directions and left and right directions relative to the occupant seated in a seat.

In this embodiment, an airbag 1 is a passenger airbag of a vehicle.

A passenger airbag apparatus S includes the airbag 1, a case 2, and an inflator (not shown). The airbag 1 is stored in the case 2 in a folded state and is inflated by the inflator. The case 2 is a container opened at an upper surface thereof and the upper surface thereof is covered with a lid (not shown). The passenger airbag apparatus S is installed on an upper surface portion of an instrument panel 4 of a motor vehicle. A windshield 5 exists above the instrument panel 4. The lid may constitute part of the instrument panel 4, and may be a plate separate from the instrument panel 4.

The airbag 1 is inflated upward so as to fill a space between the instrument panel 4 and the windshield 5 from an upper surface of the instrument panel 4 by the gas supplied by the inflator, and is inflated toward the rear side of a vehicle body so as to fill a space in front of a passenger seat as shown in FIG. 2. A surface of the inflated airbag 1 on the rear side of the vehicle body corresponds to a front surface 1F which faces the occupant on the passenger seat.

As shown in FIG. 3, in this embodiment, the airbag 1 includes a gas receiving chamber 1a positioned at a frontmost side in the fore-and-aft direction of the vehicle body, a left chamber 1b inflating on the front left side of the occupant, and a right chamber 1c inflated on the front right side of the occupant which respectively continues from the gas receiving chamber 1a. The gas receiving chamber la is provided with a gas receiving inlet 1d on a bottom surface thereof for receiving gas from the inflator.

In a state in which the inflation of the airbag 1 is completed, the left chamber 1b and the right chamber 1c respectively expand toward the occupant, and a recessed portion 10 recessed in the direction opposite from the occupant is formed therebetween as shown in FIG. 3. Reference numeral 1t designates a distal portion in the direction of expansion of the left chamber 1b and the right chamber 1c. In this embodiment, a bridging member such as a tie panel does not exist between the distal portions 1t, 1t of the left chamber 1b and the right chamber 1c of the inflated airbag 1, and the recessed portion 10 therebetween is opened toward the occupant. The recessed portion 10 extends continuously from an upper portion to a lower portion of the airbag 1. A deepest portion 11 of the recessed portion 10 is curved in such a manner that a mid-section in the vertical direction protrudes toward the occupant.

In this embodiment, the deepest portion 11 of the recessed portion 10 is positioned near an intermediate portion C (see FIG. 3) in the lateral direction of the airbag 1 in a state in which the airbag 1 is inflated. In the state in which the airbag 1 is inflated, the distal portions 1t of the left chamber 1b and the right chamber 1c are respectively positioned at a substantially same distance from the intermediate portion C. As shown in FIG. 3, when the airbag 1 is inflated, the head portion of the occupant seated on a passenger seat (not shown) at a normal seated position faces the recessed portion 10.

A depth D (FIG. 3) in the horizontal direction from the distal portions 1t of the left chamber 1b and the right chamber 1c to the deepest portion 11 of the recessed portion 10 in the state in which the inflation of the airbag 1 is completed is preferably from 20 to 150 mm, more specifically, from 30 to 70 mm. A width $W_1$ (FIG. 3) between the distal portions 1t, 1t of the left chamber 1b and the right chamber 1c in the state in which the inflation of the airbag 1 is completed is preferably from 100 to 350 mm, more specifically, from 200 to 300 mm.

A panel configuration of the airbag 1 having such an inflation-completed shape will be described later in detail.

The airbag 1 includes opening and closing vents 12, vent flaps 13 as discharging gas control members which restrict discharging of the gas from the opening and closing vents 12, and tethers 14 as connecting members extending through the interior of the airbag 1 for connecting the front surface 1F and the vent flaps 13 of the airbag 1.

In this embodiment, one of the opening and closing vents 12 is provided on each of the left and right side surfaces of the airbag 1 when inflated. In this embodiment, although the opening and closing vents 12 have a circular opening shape, the opening shape of the opening and closing vents 12 is not limited thereto.

In this embodiment, the vent flaps 13 cover the respective opening and closing vents 12 respectively from the outside of the airbag 1.

The vent flap 13 in this embodiment is formed of a base cloth having a substantially fan shape having one side 13a curved into an arcuate shape and a corner portion 13b facing the side 13a as a center of curvature of the side 13a as shown in FIG. 2. The lengths of a pair of oblique lines (not designated by reference numerals) extending from both ends of the side 13a toward the corner portion 13b are shorter than the distances between a mid-section of the side 13a in the extending direction and the corner portion 13b.

The vent flap 13 is overlapped on the opening and closing vent 12 in a position in which the side 13a is positioned on the front surface 1F side of the airbag 1 with respect to the opening and closing vent 12 and the corner portion 13b is positioned on the opposite side from the front surface 1F with the intermediary of the opening and closing vent 12 and is stitched to a side surface of the airbag 1 by a seam 13c along the side 13a in the state in which the airbag 1 is inflated. The seam 13c also extends so as to curve into an arcuate shape with the corner portion 13b side as a center of curvature.

One end of the tether 14 is connected to the corner portion 13b of the vent flap 13. In this embodiment, the vent flap 13 and the tether 14 are provided separately from each other, and the one end of the tether 14 is stitched to the corner portion 13b of the vent flap 13. Reference numeral 14a designates a seam of the stitch. In this embodiment, as shown in FIG. 2, the one end of the tether 14 is stitched to a surface of the vent flap 13 near the corner portion 13b on the side of the airbag 1. However, the vent flap 13 and the tether 14 may be integrally formed of a common base cloth.

In this embodiment, tether insertion ports 15 are provided respectively in the vicinity of the opening and closing vents 12 on the left and right side surfaces of the airbag 1 for communicating the interior and the exterior of the airbag 1. The tether insertion ports 15 are arranged on the side opposite from the front surface 1F of the airbag 1 with the intermediary of the opening and closing vents 12 in the state in which the airbag 1 is inflated. In this embodiment, although the tether insertion ports 15 have a circular opening shape, the opening shape of the tether insertion ports 15 is not limited thereto.

Mid-sections of the tethers 14 are inserted into the tether insertion ports 15, and the other ends thereof are arranged in the interior of the airbag 1. The other ends of the tethers 14 are stitched to an inner surface of the recessed portion 10 of the airbag (that is, an area between the distal portions 1t, 1t in the left chamber 1b and the right chamber 1c) in a position with which the head portion of the occupant seated on the passenger seat restrained by the seat belts (not shown) comes into contact when he or she falls into the airbag 1 upon collision of the vehicle in the state in which the airbag 1 is inflated. The reference numeral 14b designates a seam of the stitch. Hereinafter, portions of the recessed portion 10 to which the other ends of the tethers 14 are connected are referred to as tether connecting portions 16. A behavior of the occupant upon the collision of the vehicle will be described later in detail.

In the airbag 1, as shown in FIG. 2, the tether connecting portion 16 is arranged at a position of the recessed portion 10 with which the head portion, more preferably, the chin portion of a small size occupant seated on the passenger seat with the seat belt fastened comes into contact when he or she falls into the airbag 1 upon collision of the vehicle in the state in which the airbag 1 is inflated.

As shown in FIG. 3, the tether connecting portions 16 are preferably arranged in a range $W_2$ from 0 to 80 mm, more specifically, from 10 to 50 mm to the left and right from the deepest portion 11 of the recessed portion 10, that is, from the center portion of the recessed portion 10 in the lateral direction in the state in which the airbag 1 is inflated.

In this embodiment, although the left tether 14 which continues from the vent flap 13 on the left side surface of the airbag 1 and the right tether 14 which continues from the vent flap 13 on the right side surface thereof are connected to positions slightly apart from each other in the left and right direction from the deepest portion 11 of the recessed portion 10 respectively, they may be connected to the deepest portion 11. The tethers 14 may be connected to each other by being connected to the recessed portion 10 at a distance in the lateral direction as shown in the drawing, and may also be connected to the same position. The tethers 14 may be connected to the recessed portion 10 at positions shifted in the vertical direction.

The panel configuration of the airbag 1 is as follows.

The airbag 1 includes left and right outside panels 21 and left and right inside panels 22. The respective panels 21, 22 are formed of woven cloths coated with a synthetic resin.

The outside panels 21 constitute outwardly faced left and right surfaces of the airbag 1 and portions extending from an upper surface to a bottom surface of the gas receiving chamber 1a. Portions of the outside panels 21 which constitute the outwardly faced left and right surfaces of the airbag 1 are provided with the opening and closing vents 12 and the tether insertion ports 15, and a portion which constitutes the bottom surface of the gas receiving chamber 1a is provided with the gas receiving chamber 1d and a mounting portion (not shown) for mounting the airbag into the case 2. The inside panels 22 constitute surfaces extending to the recessed portion 10 of the airbag 1. The outside panels 21 and the inside panels 22 are stitched to each other by stitched seams 23.

The vent flaps 13 are stitched to the outer surfaces of the respective outside panels 21. The other ends of the tethers 14 are stitched to inner side surfaces of the respective inside panels 22.

In this embodiment, when folding the airbag 1, the airbag 1 is folded in advance in a state in which the respective tethers 14 are pulled inwardly of the airbag 1 so that the respective vent flaps 13 are overlapped with the respective opening and closing vents 12 and the respective tethers 14 extend without slackness between the respective corner portions 13b of the vent flap 13 and the respective tether insertion ports 15. By folding in this manner, the respective opening and closing vents 12 assume a state of being closed by the vent flaps 13 from the start of inflation of the airbag 1 when the airbag is inflated. A method of folding the airbag 1 is arbitrary, and the method of folding the airbag 1 is not limited thereto.

Subsequently, an operation of an airbag apparatus S having the airbag 1 configured as described above will be described.

Upon collision of the vehicle on which the passenger airbag apparatus S is mounted, the inflator is activated to inject gas, and the airbag 1 starts to be inflated by the gas from the inflator. The airbag 1 opens the lids, and is inflated and deployed from the upper surface of the instrument panel 4 toward the occupant on the passenger seat.

In this embodiment, since the airbag 1 is folded in the state in which the vent flaps 13 covers the opening and closing vents 12 in advance, the opening and closing vents 12 of the airbag 1 is closed by the vent flaps 13 from the beginning of the inflation, and hence the gas is not discharged from the opening and closing vents 12. Accordingly, the airbag 1 is inflated quickly.

In association of the expansion of the front surface 1F toward the occupant according to the expansion of the airbag 1, the tethers 14 are pulled inwardly of the airbag 1, and the corner portions 13b of the vent flaps 13 are pulled in the direction away from the sides 13a via the tether 14. Accordingly, the vent flaps 13 are tensed along the side surfaces of the airbag 1, so that the vent flaps 13 are not moved away from the opening and closing vents 12 even when the internal pressure of the airbag 1 is increased. Accordingly, the opening and closing vents 12 are kept in a closed state by the vent flaps 13 until the occupant on the passenger seat comes into contact with the front surface 1F of the inflated airbag 1, so that the interior of the airbag 1 is maintained at a high internal pressure.

Subsequently, in a case where the occupant comes into contact with the front surface 1F of the inflated airbag 1, and the tether connecting portion 16 of the recessed portion 10 of the front surface 1F is pushed backward toward the interior of the airbag, the tethers 14 are loosened, and the vent flaps 13 is moved away from the opening and closing vents 12 by the gas pressure in the interior of the airbag 1, so that the opening and closing vents 12 are opened. Consequently, the gas is discharged to the outside of the airbag 1 from the opening and closing vents 12 and the occupant is softly received by the airbag 1.

In this case, a left chest of the occupant is received by the inflated left chamber 1b, and a right chest of the occupant is received by the inflated right chamber 1c, and the head portion is received by being entered into the recessed portion 10 therebetween.

When the occupant has a small size, since a kinetic energy of the occupant upon collision of the vehicle is relatively small, the opening and closing vents 12 are preferably opened in a relatively early stage to allow the gas to be discharged from the airbag 1. In contrast, when the occupant has a large size, since the kinetic energy upon collision of the vehicle is relatively large, the timing to open the opening and closing vents 12 is preferably delayed in comparison to the case where the occupant has the small size, thereby maintaining the internal pressure in the airbag 1 at a high level for a relatively long time.

In the airbag 1, the tethers 14 are connected to a position of the recessed portion 10 where the small size occupant seated on the passenger seat with the seat belt fastened, that is, the AF05 type occupant dummy comes into contact with when he or she falls into the airbag 1 upon collision of the vehicle in the state in which the airbag 1 is inflated. When the occupant is seated on the passenger seat with the seat belts (not shown) fastened, the occupant is constrained at the lumbar part from moving forward by the lap belt (not shown) upon collision of the vehicle as indicated by a double-dashed chain line in FIG. 2, the upper half body of the occupant rotatingly moves toward the front relative to the lumbar part as an axis. Therefore, the head portion of the occupant comes into contact with the inflated airbag 1 in a relatively early stage in comparison with other parts. Therefore, when the small size occupant seated on the passenger seat with the seat belt fastened falls into the inflated airbag 1, the head portion of the occupant comes into contact with the tether connecting portions 16 of the recessed portion 10 in an early stage to move the same backward, and hence the opening and closing vents 12 are opened in an early stage.

In this embodiment, the tether connecting portions 16 are arranged at a position of the recessed portion 10 where the head portion of the small size occupant seated on the passenger seat with the seat belt fastened comes into contact with when he or she falls into the airbag 1 upon collision of the vehicle in a state in which the airbag 1 is inflated, and are positioned in the range $W_2$ of 30 mm to the left and right from the center portion of the recessed portion 10 in the lateral direction, so that the tether connecting portions 16 are moved backward quickly and the opening and closing vents 12 are opened when the head portion of the small size occupant comes into contact with the recessed portion 10.

When the large size occupant seated on the passenger seat with the seat belt fastened, that is, the AM50 type occupant dummy in this embodiment falls into the inflated airbag 1, as shown by a double-dashed chain line in FIG. 5, the tether connecting portions 16 of the recessed portion 10 faces a portion near the lower chest portion rather than the head portion of this occupant, so that the head portion of this occupant comes into contact with the recessed portion 10 above the tether connecting portions 16. Therefore, even when the head portion of the occupant presses the recessed portion 10, the timing when the tether connecting portions 16 starts to move backward is delayed in comparison with the case where it is pressed directly by the head portion of the small size occupant, and the amount of backward movement is also small. Accordingly, the opening and closing vents 12 are opened later than the case where the of the airbag 1 receives the small size occupant, and the amount of release is also small, so that the internal pressure in the airbag 1 is maintained at a high level for a relatively long time and hence the occupant is stably received.

When the occupant is not restrained by the seat belt, even though the occupant has the small size, the kinetic energy is large, and hence the timing of release of the opening and closing vents 12 is preferably delayed to maintain the internal pressure in the airbag 1 at a high level over a relatively long time.

When the occupant is not restrained by the seat belt, since the forward movement of the lumbar part of the occupant is not constrained by the lap belt upon collision of the vehicle, the occupant is moved forward with little bending of the upper half body toward the front as indicated by a double-dashed chain line in FIG. 6. Therefore, even though the occupant has the small size, the head portion of the occupant comes into contact with the recessed portion 10 above the tether connecting portions 16 of the inflated airbag 1. Therefore, in this case as well, when the head portion of the occupant comes into contact with the front surface 1F of the airbag 1, the opening and closing vents 12 are not opened or widely opened immediately, and the internal pressure of the airbag is maintained relatively at a high level for a relatively long time.

Accordingly, even though the occupant has the small size, when the occupant is not restrained by the seat belt, the internal pressure of the airbag 1 is maintained at a high level for a relatively long time, so that the occupant is stably received.

When the occupant is not restrained by the seat belt in this manner, since the occupant is moved forward with little bending of the upper half body toward the front, and hence the portion of the occupant near the chest portion comes into contact with the front surface 1F of the inflated airbag 1 in a relatively early stage. In this airbag 1, when the occupant is large, the tether connecting portions 16 face the chest portion of the occupant when the airbag is inflated. Therefore, at the level of the tether connecting portions 16, as shown in FIG. 7, the portion of the occupant near the chest portions is received by the left chamber 1b and the right chamber 1c in the inflated state. Therefore, since the tether connecting portions 16 are positioned inside the recessed portion 10, the tether connecting portions 16 are not pressed by the portion near the chest portion as well immediately after the portion of the occupant near the chest portion comes into contact with the airbag 1.

Subsequently, as shown in FIG. 8, when the portion of the occupant near the chest portion moves the distal portions 1t of the left chamber 1b and the right chamber 1c backward inwardly of the airbag to the same level as the deepest portion 11 of the recessed portion 10, the tether connecting portions 16 come into contact with the portion near the chest portion and are moved backward inwardly of the airbag. Accordingly, the tether connecting portions 16 are not pressed immediately after the occupant comes into contact with the front surface 1F, and the opening and closing vents 12 are opened after the portion of the occupant near the chest portion comes into contact with the front surface 1F, so that the internal pressure of the airbag 1 is maintained at a high level for a relatively long time and the occupant is stably received.

COMPARATIVE EXPERIMENT

The connecting position of the tether 14 to the recessed portion 10 in a state in which the airbag 1 was inflated was changed as follows, and head portion injury values when the inflated airbag 1 received the occupant were measured.

Embodiment 1

The tethers 14 were connected to positions of the recessed portion 10 where the chin portion of the AF05 type occupant dummy seated on the passenger seat with the seat belt fastened contacted when it fell into the airbag 1 in the state in which the airbag 1 was inflated.

Comparative Example 1

The tethers 14 were connected to positions of the recessed portion 10 lower than that in Embodiment 1 by 80 mm in the state in which the airbag 1 was inflated.

Comparative Example 2

The tethers 14 were connected to positions of the recessed portion 10 lower than that in Embodiment 1 by 160 mm in the state in which the airbag 1 was inflated.

In any of Embodiment 1, Comparative Examples 1 and 2, the tethers 14 were connected to the positions near the center portion (deepest portion 11) of the recessed portion 10 in the lateral direction in the state in which the airbag 1 was inflated.

About Embodiment 1, Comparative Examples 1 and 2, a vehicle collision experiment was conducted in the following cases 1 to 4, and head injury values were measured.

Case 1: The AF05 type dummy was used as the occupant, and the vehicle was caused to collide in the state in which the seat belt was fastened.

Case 2: The AF05 type dummy was used as the occupant, and the vehicle was caused to collide in the state in which the seat belt was not fastened.

Case 3: The AM50 type dummy was used as the occupant, and the vehicle was caused to collide in the state in which the seat belt was fastened.

Case 4: The AM50 type dummy was used as the occupant, and the vehicle was caused to collide in the state in which the seat belt was not fastened.

TABLE 1

|  | Embodiment 1 | Comparative Example 1 | Comparative Example 2 |
| --- | --- | --- | --- |
| case 1 | very good | very good | good |
| case 2 | very good | very good | very good |
| case 3 | very good | good | good |
| case 4 | very good | very good | very god |

As is apparent from Table 1, in Embodiment 1, very good occupant protecting performance was demonstrated in all of cases 1 to 4.

Figure 10:
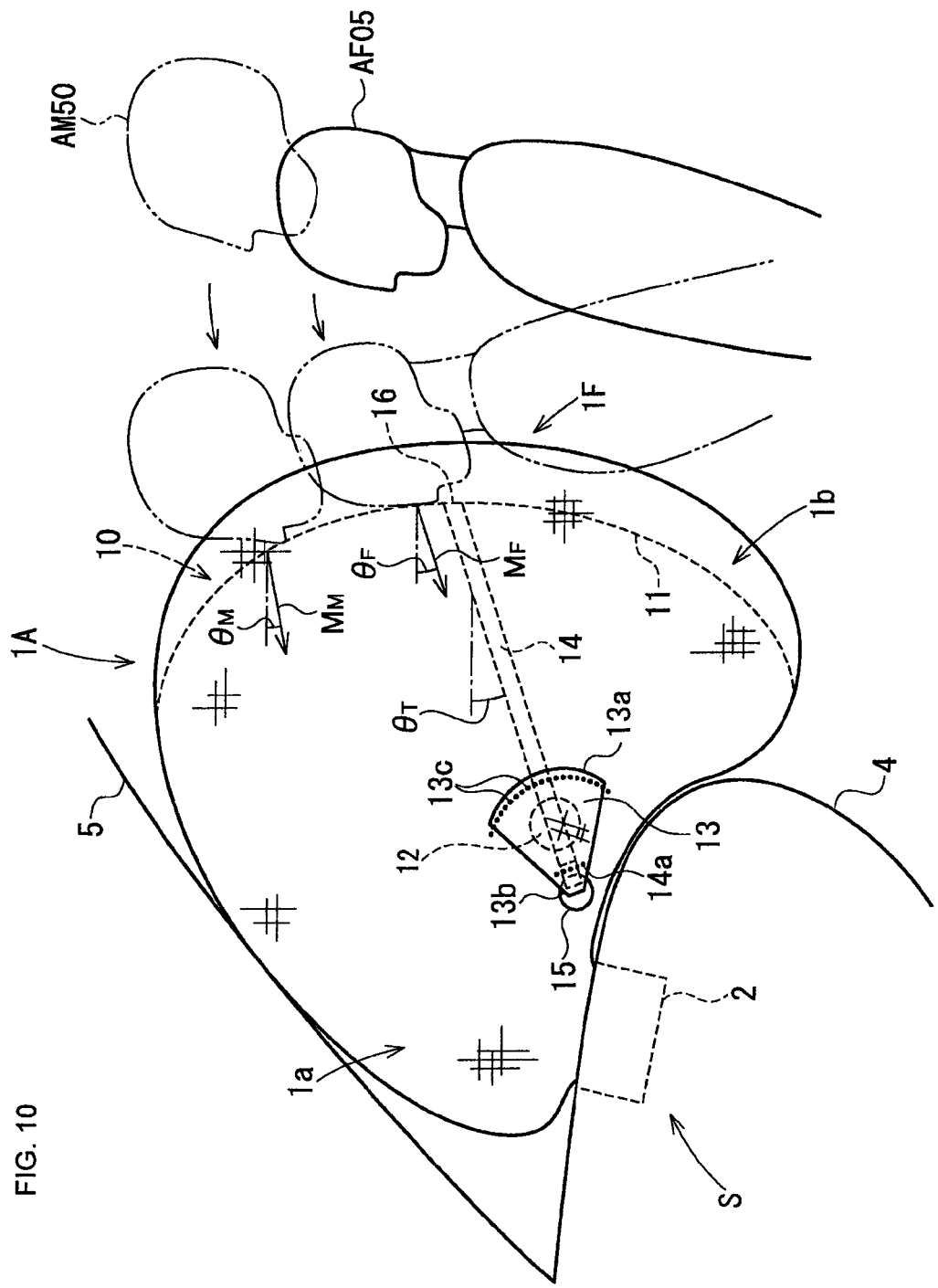
FIG. 10 is a side view of the airbag and the airbag apparatus according to an embodiment in a case wherein the occupant is restrained by the seat belt.
Figure 11:
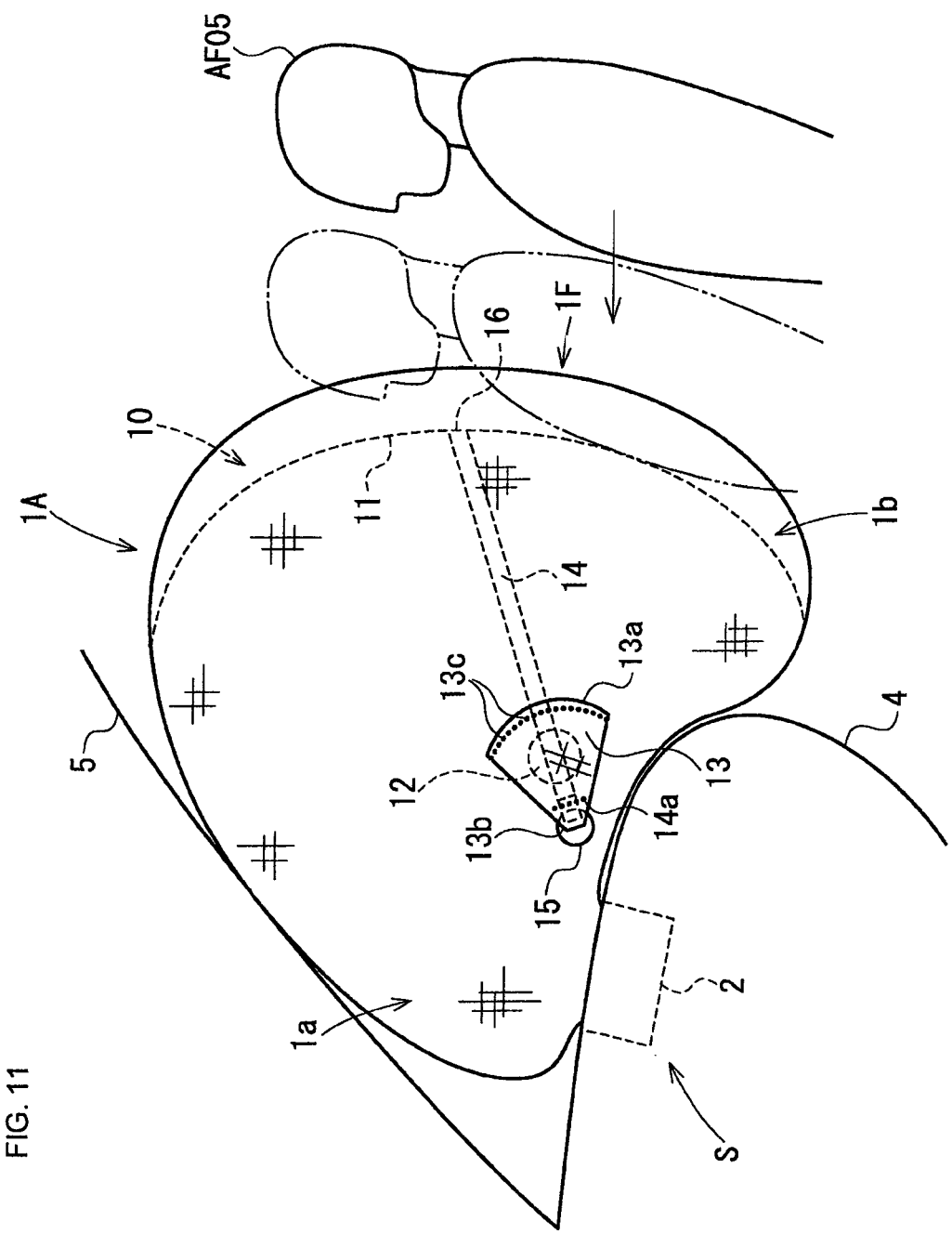
FIG. 11 is a side view of the airbag and the airbag apparatus in FIG. 10 in a case wherein the occupant is not restrained by the seat belt.

FIGS. 10 and 11 are side views of the airbag and the airbag apparatus according to another embodiment. FIG. 10 shows a behavior of the occupant when the seat belt is fastened, and FIG. 11 shows a behavior when the occupant is not restrained by the seat belt.

In an airbag 1A in this embodiment, the tethers 14 extend obliquely so as to be lower as they go away from the front surface 1F (recessed portion 10) in the state in which the airbag 1A is inflated.

As shown in FIG. 10, an angle $\theta_T$ of the direction of extension of the tether 14 with respect to the horizontal direction when the airbag is inflated is substantially parallel to an angle $\theta_F$ of a direction of movement $M_F$ of the head portion of the AF05 type dummy restrained by the seat belt with respect to the horizontal direction when it falls into the inflated airbag 1A and the head portion thereof comes into contact with the recessed portion 10. More specifically, the angle $\theta_T$ of the direction of extension of the tether 14 with respect to the horizontal direction when the airbag is inflated is preferably from 0 to 50°, more specifically, from 15 to 45°.

Other configurations of the airbag 1A are the same as those of the airbag 1 shown in FIGS. 1 to 8, and same reference numerals as in FIGS. 1 to 8 designate the same parts in FIGS. 10, 11.

In the airbag 1A configured in this manner, in the state in which the airbag 1A is inflated, when the tether connecting portions 16 of the recessed portion 10 are moved backward in parallel to the direction of extension of the tethers 14, the amounts of slackness of the tethers 14 become maximum in comparison with the case in which the tether connecting portions 16 are moved backward in the direction closer to the horizontal direction than that and closer to the vertical direction than that.

In other words, in the airbag 1A, when the AF05 type dummy restrained by the seat belt falls into the inflated airbag 1A, the head portion of the occupant comes into contact with the tether connecting portions 16 in an early stage, and the head portion of the occupant causes the tether connecting portions 16 to move backward in substantially parallel to the direction of extension of the tethers 14, so that the opening and closing vents 12 are opened quickly and widely as shown in FIG. 10.

As shown in FIG. 10, an angle $\theta_M$ of a direction of movement $M_M$ of the head portion at the time when the AM50 type dummy restrained by the seat belt falls into the inflated airbag 1A and the head portion thereof comes into contact with the recessed portion 10 with respect the horizontal direction is generally smaller than the angle $\theta_T$ of the tether 14 described above.

Therefore, in the airbag 1A, when the AM50 type dummy restrained by the seat belt falls into the inflated airbag 1A, as shown in FIG. 10, the head portion thereof comes into contact with the recessed portion 10 at a portion above the tether connecting portions 16, and the contact portion is moved backward at the angle $\theta_M$ which is smaller than the angle $\theta_T$ of the tethers 14, so that the opening and closing vents 12 are opened later and the openings of the opening and closing vents 12 are small in comparison with the case in which the inflated airbag 1A receives the AF05 type dummy restrained by the seat belt. Accordingly, the internal pressure in the airbag 1A is maintained at a high level for a relatively long time, and the occupant is stably received.

When the occupant is not restrained by the seat belt, as shown in FIG. 11, the occupant moves forward with little bending toward the front upon collision of the vehicle. Therefore, when this occupant comes into contact with the front surface 1F of the inflated airbag 1A, the front surface 1F is pressed by the occupant in the substantially horizontal direction. Therefore, in this case as well, in the same manner as the case where the AM50 type dummy restrained by the seat belt described above is received, the opening and closing vents 12 are opened later and the openings of the opening and closing vents 12 are small in comparison with the case where the AF05 type dummy restrained by the seat belt are received. Accordingly, the internal pressure in the airbag 1A is maintained at a high level for a relatively long time, and the occupant is stably received.

In this case, when the occupant who is not restrained by the seat belt has the large size, since the position with which the head portion comes into contact is shifted further upward from the tether connecting portions 16, the timing to open the opening and closing vents 12 is delayed and the openings of the opening and closing vents 12 are small in comparison with the case in which the occupant who is not restrained by the seat belt has the small size. Accordingly, since the internal pressure in the airbag 1A is maintained at a high level for a further long time, the occupant is stably received even when the occupant is the large size occupant who is not restrained by the seat belt, which has a very large kinetic energy.

Figure 12:
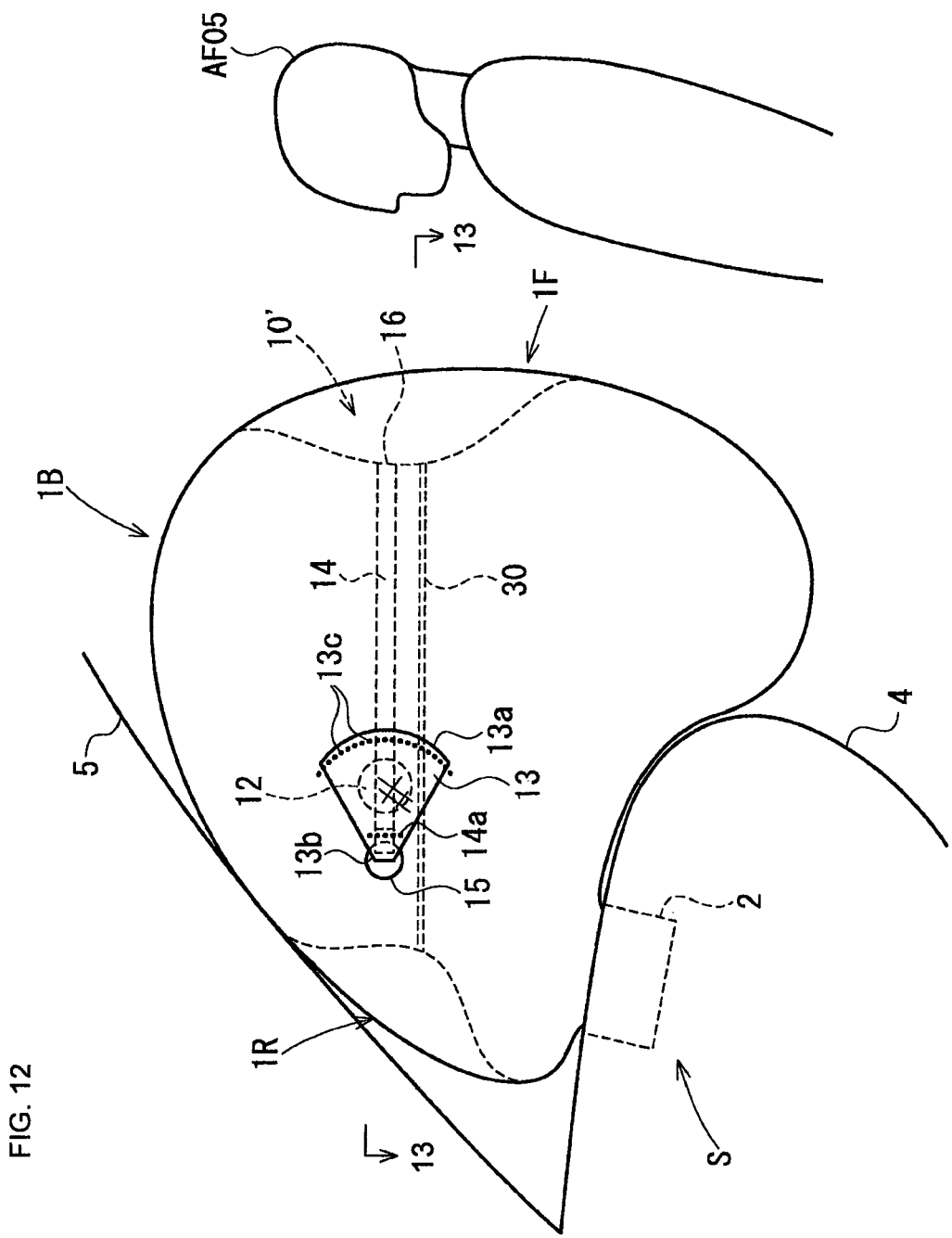
FIG. 12 is a side view of the airbag and the airbag apparatus according to an embodiment.
Figure 13:
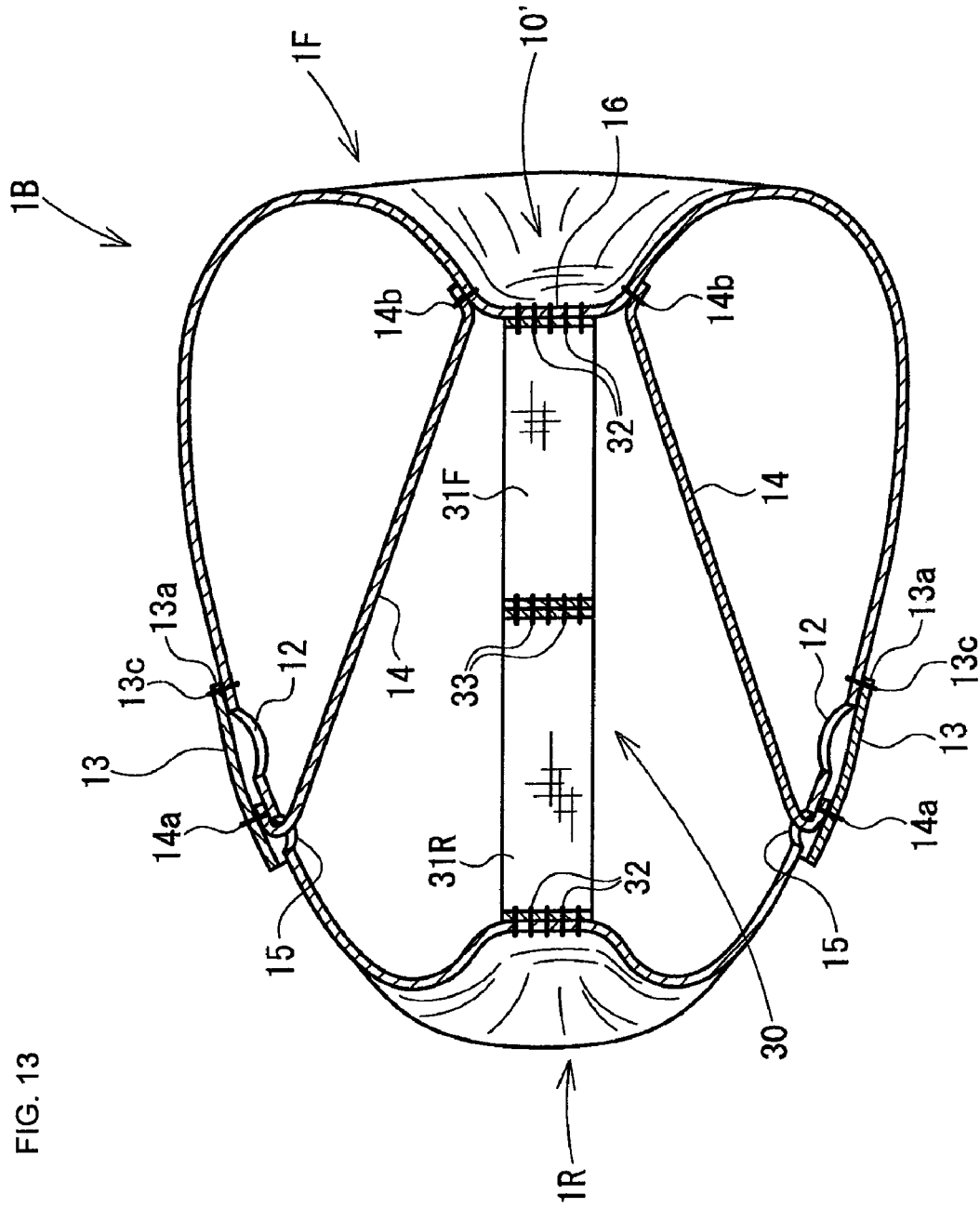
FIG. 13 is a cross-sectional view taken along line 13-13 in FIG. 12.

In the airbags 1, 1A in the embodiments described above, the center portion of the front surface 1F in the lateral direction is adapted to assume the recessed portion 10 recessed inwardly of the airbag when the airbag is inflated by stitching the inside panels 22, 22 which continue to the recessed portion 10 so as to be recessed inwardly of the airbag. However, a method of causing a head-facing portion of the front surface to be recessed when the airbag is inflated is not limited thereto. Another configuration of the airbag in which the recessed portion is formed on the front surface when inflated will be shown in FIGS. 12 and 13. FIG. 12 is a side view of the airbag and the airbag apparatus according to another embodiment, and FIG. 13 is a cross-sectional view taken along the line 13-13 in FIG. 12.

In an airbag 1B in this embodiment, a suspender tape 30 which connects the front surface 1F and a counter-front surface 1R on the opposite side is provided inside the airbag 1B.

An end portion of the suspender tape 30 on the side of the front surface 1F is joined to the front surface 1F near the center in the lateral direction at a level opposing the head portion of the AF05 type dummy when the airbag is inflated stitching or the like. Accordingly, in a state in which the airbag 1B is inflated, an area of the front surface 1F which faces the head portion of the AF05 type dummy corresponds to a recessed portion 10' which is recessed inwardly of the airbag, and hence both left and right sides thereof protrude toward the occupant with respect to the recessed portion 10'. Reference numeral 32 designates seams whereby both ends of the suspender tape 30 are stitched to the front surface 1F and the counter-front surface 1R respectively.

In this embodiment, the suspender tape 30 is formed of band-shaped base cloths. Each of the band-shaped base cloths is separated for the front surface 1F side or the counter-front surface 1R side from a mid-section in the longitudinal direction thereof. These base cloths are connected so that the suspender tape 30 has a predetermined length. Reference numeral 33 designates a seam which connects these base cloths.

Other configurations of the airbag 1B are the same as the airbag 1 shown in FIGS. 1 to 8.

Even with the airbag 1B, the same effects and advantages as in the airbag 1 in FIGS. 1 to 8 are achieved.

The embodiments described above are only examples of the present invention, and the present invention is not limited to the embodiments described above.

For example, in the respective embodiments described above, although the opening and closing vents are provided on the left and right side surfaces of the airbag, two or more of the opening and closing vents may be provided for each of the side surfaces. Also, the opening and closing vent may be formed on any one of side surfaces of the airbag.

In the respective embodiments described above, the vent flaps which cover the opening and closing vents from the outside of the airbag are provided as the discharging gas control members for restraining the discharging of the gas from the opening and closing vents. However, the configuration of the discharging gas control member is not limited thereto.

For example, the gas discharging restraining member may be a vent flap which covers the opening and closing vent from the inside of the airbag. Alternatively, the gas discharging restraining member may be arranged at a peripheral edge portion of the opening and closing vent, so as to enclose the opening and closing vent by being pulled inwardly of the airbag to close or slightly open the opening and closing vent. The discharging gas control member may be configured to have a cylindrical duct connected to the opening and closing vent, so that the duct is pulled inwardly of the airbag to close or slightly open, and the duct is pushed outwardly of the airbag by the gas pressure in the airbag to open or widely open the opening and closing vent via the duct. The restraining member may have other configuration as a matter of course.

In the respective embodiments described above, a constantly opened vent which constantly communicates the interior and the exterior of the airbag may be provided.

In the respective embodiments described above, the vent flap is configured to close the entire part of the opening and closing vent. However, it may be configured to bring the opening and closing vent from the large opening to the small opening. For example, it may be configured in such a manner that the opening and closing vent is partly protruded from the vent flap and the protruded portion allows the gas to be discharged therefrom even when the vent flap is overlapped with the opening and closing vent. Alternatively, a configuration in which a hole of a smaller diameter than the opening and closing vent is provided at a position of the vent flap overlapped with the opening and closing vent, and the gas is allowed to be discharged via this hole even when the opening and closing vent is closed is also applicable.

In the respective embodiments described above, the respective vents are substantially circular openings. However, the shapes of the respective vents are not limited thereto, and may be shapes other than the circular shape, for example, a slit-shape.

The respective embodiments described above are examples of applications of the present invention to the airbag or the airbag apparatus for the passenger seat in the vehicle. However, the present invention may be applied to various airbags and the airbag apparatuses other than those described above such as the airbags and the airbag apparatuses for a driver's seat or rear seats, for example.

The disclosure of Japanese Patent Application No. 2008-203245 filed on Aug. 6, 2008 is incorporated as a reference.

While the invention has been explained with reference to the specific embodiments of the invention, the explanation is illustrative and the invention is limited only by the appended claims.

What is claimed is:

1. A combination comprising a case and an airbag to be inflated by gas for a vehicle,
   said airbag being attached to the case at one portion thereof and comprising:
   a base member for forming the airbag, the base member including, at a side facing a seated occupant, a head-facing portion adapted to receive a head portion of the seated occupant thereagainst when the airbag is inflated;
   a vent provided in the base member; and
   a control member for restraining gas from discharging through the vent, said control member closing the vent when an occupant does not contact a front surface of the airbag facing the occupant when the airbag is inflated, and opening the vent when the occupant contacts the head-facing portion and the head-facing portion is pushed in a direction opposite to the occupant,
   wherein the control member comprises:
   a vent flap disposed on an external surface of the airbag, and
   a tether which has:
      a first end connected to an inner surface of the airbag at a location proximate the head-facing portion above the case when the airbag is inflated so that when the airbag is fully inflated, the head-facing portion is recessed by the tether to form a recessed portion,
      a portion which extends in an unrestricted, contact free state through an interior of the airbag and which passes out of the airbag through a tether insertion portion provided in the airbag, and
      a second end connected to the vent flap externally of the air bag, the vent flap and the tether being connected in a manner to maintain the vent closed by the vent flap while a predetermined tension exists in the tether extending through the interior of the airbag.

2. The combination according to claim 1, wherein the tether extends through the interior of the airbag in substantially a direction in which the head-facing portion is pressed by the head portion of the occupant when viewing the airbag from a lateral side of the vehicle.

3. The combination according to claim 1, wherein the tether extends through the interior of the airbag substantially horizontally or downwardly from the head-facing portion when the airbag is inflated.

4. The combination according to claim 3, wherein the tether extends through the interior of the airbag at an angle from 0 to 50° relative to a horizontal line when the airbag is inflated.

5. The combination according to claim 1, wherein the tether is connected to the head-facing portion in a range from 0 to 80 mm from a center of the head-facing portion in a right to left direction of the occupant when the airbag is inflated.

6. An airbag apparatus, comprising the airbag and case according to claim 1, and an inflator for inflating the airbag.

7. The combination according to claim 1, wherein the recessed portion extends continuously from an upper portion to a lower portion of the airbag.

8. The combination according to claim 7, wherein the recessed portion has a deepest portion, said deepest portion being curved so as to protrude toward the occupant at a middle portion thereof in a vertical direction of the airbag.

9. The combination according to claim 7, wherein the recessed portion extends along a middle portion of the airbag in a right to left direction of the vehicle.

10. The combination according to claim 1, wherein the vent flap has a substantially fan shape.

11. The combination according to claim 1, wherein said airbag further comprises:
    a second control member comprising a second tether which has:
       a first end connected to an inner surface of the airbag at a location proximate the head-facing portion,
       a portion which extends in an unrestricted, contact free state through an interior of the airbag and which passes out of the airbag through a second tether insertion portion provided in the airbag, and
       a second end connected to a second vent flap externally of the air bag, the second vent flap and the second tether being connected in a manner to maintain a second vent closed by the second vent flap while a predetermined tension exists in the second tether extending through the interior of the airbag.

12. The combination according to claim 11, wherein the tether and the second tether are essentially mirror images of one another.

13. The combination according to claim 12, wherein the first tether extends between the first vent flap and the inner surface without connecting to another member, and the second tether extends between the second vent flap and the inner surface without connecting to another member.

14. The combination according to claim 1, wherein the tether insertion portion comprises one of a port-shaped opening and a slit-shaped opening.

15. The combination according to claim 1, wherein the airbag further comprises a suspender tape having a first end attached to the head facing portion and a second end attached to the base member at a side opposite to the head facing portion.

16. The combination according to claim 15, wherein the suspender tape substantially horizontally extends when the airbag is fully inflated.

17. The combination according to claim 16, wherein the tether extends substantially horizontally above the suspender tape when the airbag is fully inflated.

18. An airbag to be inflated by gas for a vehicle, comprising:
    a base member for forming the airbag, the base member including, at a side facing a seated occupant, a head-facing portion adapted to receive a head portion of the seated occupant thereagainst when the airbag is inflated, first and second vertically extending bulbous portions with a vertically extending recessed portion therebetween when the airbag is completely inflated, the recessed portion defining the head-facing portion adapted to receive the head portion of the seated occupant thereagainst;

a vent provided in the base member; and a control member for restraining gas from discharging through the vent, said control member closing the vent when an occupant does not contact a front surface of the airbag facing the occupant when the airbag is inflated, and opening the vent when the occupant contacts the head-facing portion and the head-facing portion is pushed in a direction opposite to the occupant, wherein the control member comprises:

a vent flap disposed on an external surface of the airbag, and a tether which has:
   a first end connected to an inner surface of the airbag at the recessed portion of the head-facing portion,
   a portion which extends substantially horizontally in an unrestricted, contact free state through an interior of the airbag and which passes out of the airbag through a tether insertion portion provided in the airbag, and a second end connected to the vent flap externally of the air bag, the vent flap and the tether being connected in a manner to maintain the vent closed by the vent flap while a predetermined tension exists in the tether extending through the interior of the airbag.

\* \* \* \* \*